June 7, 1932.  O. WITTEL  1,861,891
MOTION PICTURE FILM REEL
Filed Aug. 26, 1927
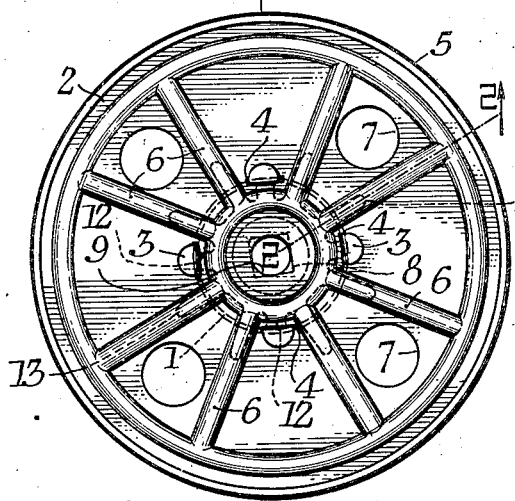
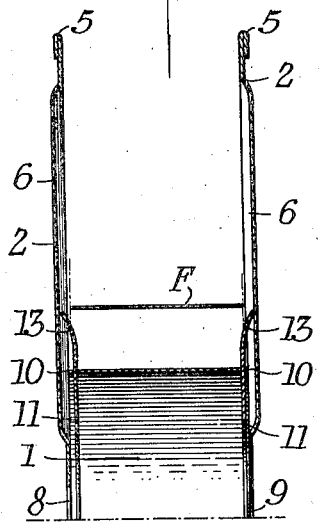
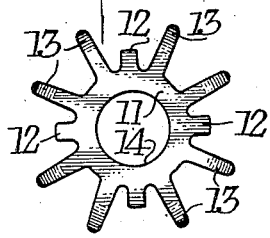
Inventor,
Otto Wittel,
P. L. Strichfield
N. M. Perrins
By  Attorneys Patented June 7, 1932

1,861,891

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

MOTION PICTURE FILM REEL

Application filed August 26, 1927. Serial No. 215,618.

This invention relates to reels for motion picture film and more particularly has for its object reels so designed that the end film may be very easily caught around the core. I accomplish this by providing slight projections near the core which engage the edges of the film and by compression of the film, or the projections or both, holding the end of the film sufficiently until additional convolutions are wound upon it.

The above and other objects and advantages will be apparent from the following description wherein reference is made to the accompanying drawing in which the same reference characters denote the same parts throughout and in which,—

Fig. 1 is a side view of a reel embodying my invention,

Fig. 2 is a section on line 2—2 of Fig. 1,

Fig. 3 is a view of a part of my preferred form.

The reel as shown, is of sheet metal and comprises a cylindrical core 1 and side flanges 2, secured to the ends of the core by ears 3 extending from the core through slots 4 in the flanges and turned over. The flanges may have turned over rims 5, strengthening bosses 6 and any desired apertures 7. The flanges as a whole lie outside of parallel planes determined by their inner surface and are separated by a distance greater than the width of the film with which they are to be used.

One of the flanges has a square axial hole 8 and the other a round axial aperture 9.

The core has a series of slots 10 at its end. Positioned in each end of the core is a spider-like plate 11 having a series of short square ended lugs 12 and a series of longer tapering fingers 13 which extend through the slots 10. The slots 10 are so positioned that when the reel is assembled as shown the lugs 12 abut the inner surface of the core at the points where the ears 4 extend therefrom. The fingers 13 are bent outwardly and engage the inner surfaces of the radial bosses 6. The engagement of the fingers 12 with the bosses and the edges of slots 10 and the engagement of the lugs 11 with the core hold these plates securely in place. The plates have central openings 14.

In Fig. 2 a piece of film F is shown. It is to be noted this is enough narrower than the distance between the flanges to permit of its ready insertion between them, and that the distance between the fingers 12 at the points where they join the core is less than the width of the film and that the fingers diverge as they leave the core.

It is to be noted that the projections at their bases near the core leave a space narrower than the film, and that they taper apart. If an end of film is thrust down by the finger of the user into contact with the core, or nearly so, it will be held by compression, which may be of the material of the film as when the bosses are rigid, or by the resilience of the projections when they are very light and elastic, or as would usually be the case, by both.

This thrusting of the film down into place is the only operation necessary as this will cause the film end to be held while the reel is turned and succeeding convolutions will bind the film firmly in place.

I contemplate as included within my invention all such modifications and equivalents as fall within the scope of the appended claims.

Having thus described my invention, what I claim as new and desire to secure by Letters Patent is:

1. A reel for use with motion picture film and comprising a core, flanges rigidly secured to the ends of the core and forming a space therebetween into which a film strip may be wound, and a spider-like structure carried at one end of the reel, and having resilient portions extending along said flanges within said space and constituting projections adapted to engage and clamp the end of a film when inserted into the space.

2. A reel for use with motion picture film and comprising a core, flanges rigidly secured to the ends of the core and forming a space therebetween into which a film strip may be wound and a spider-like structure carried at each end of the core and having resilient portions extending along the flanges and within said spaces and constituting projections adapted to engage and clamp the end of a film when inserted into the space.

3. A reel for use with motion picture film and comprising a core, flanges rigidly secured to the ends of the core and forming a space therebetween into which a film strip may be wound and a spider-like structure carried at each end of the core, the spider-like structures being symmetrical with respect to the core and having resilient portions extending along the flanges and within said space and constituting projections adapted to engage and clamp the end of a film when inserted into the space.

4. A reel for use with motion picture film and comprising a core, flanges rigidly secured to the ends of the core and forming a space therebetween into which a film strip may be wound and radially extended projections carried by the reel and extending along said flanges within the space, the outer ends of the projections being free and adapted to engage resiliently the end of a film when inserted into the space.

5. A reel for use with motion picture film and comprising a core, flanges rigidly secured to the ends of the core and forming a space therebetween into which a film strip may be wound, and resilient fingers radial of at least one of the flanges and situated within the space, the outer ends of the fingers being free and adapted to engage resiliently the end of a film band when inserted into the space.

Signed at Rochester, New York, this 22nd day of August, 1927.

OTTO WITTEL.